Feb. 20, 1940.            S. A. SNELL                2,191,356
                   WINDSHIELD WIPER MECHANISM
                   Filed June 21, 1939      3 Sheets-Sheet 1
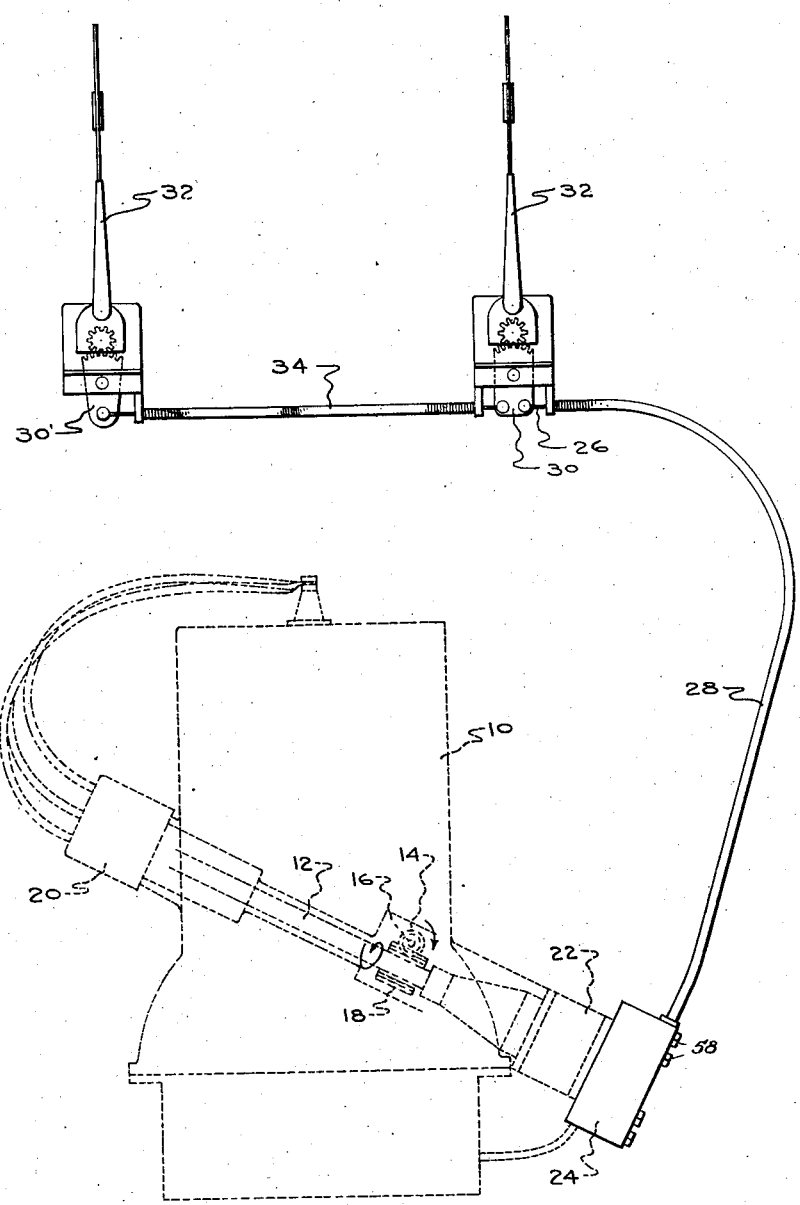
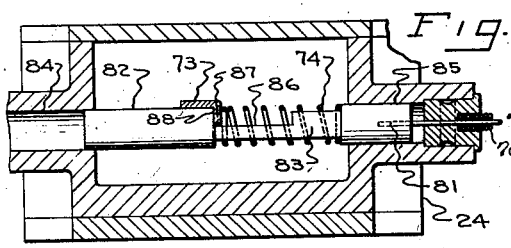
Fig. 1
Fig. 10
Inventor
SAMUEL A. SNELL
By Beaman & Langford
Attorneys Feb. 20, 1940.    S. A. SNELL    2,191,356
WINDSHIELD WIPER MECHANISM
Filed June 21, 1939    3 Sheets-Sheet 2
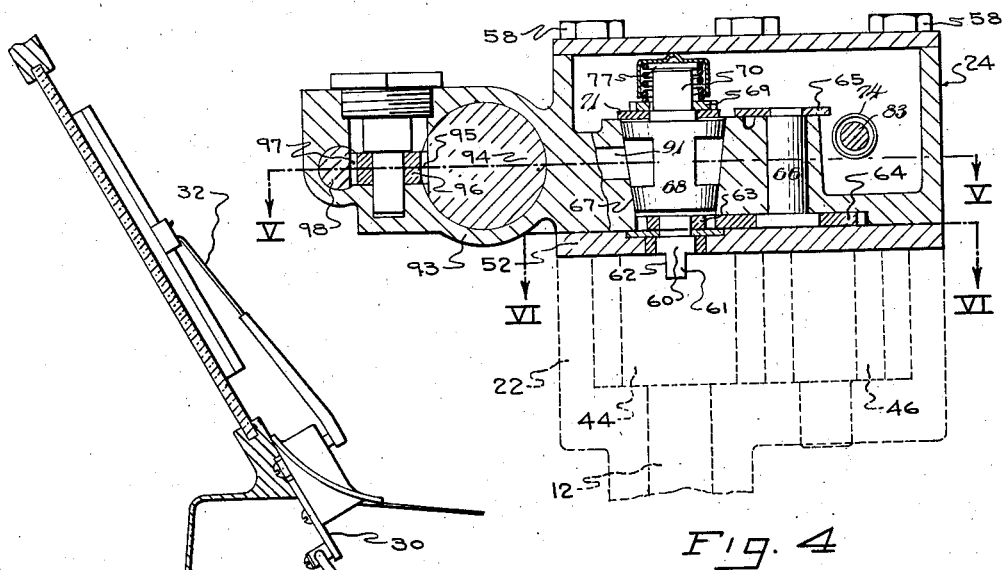
Fig. 4
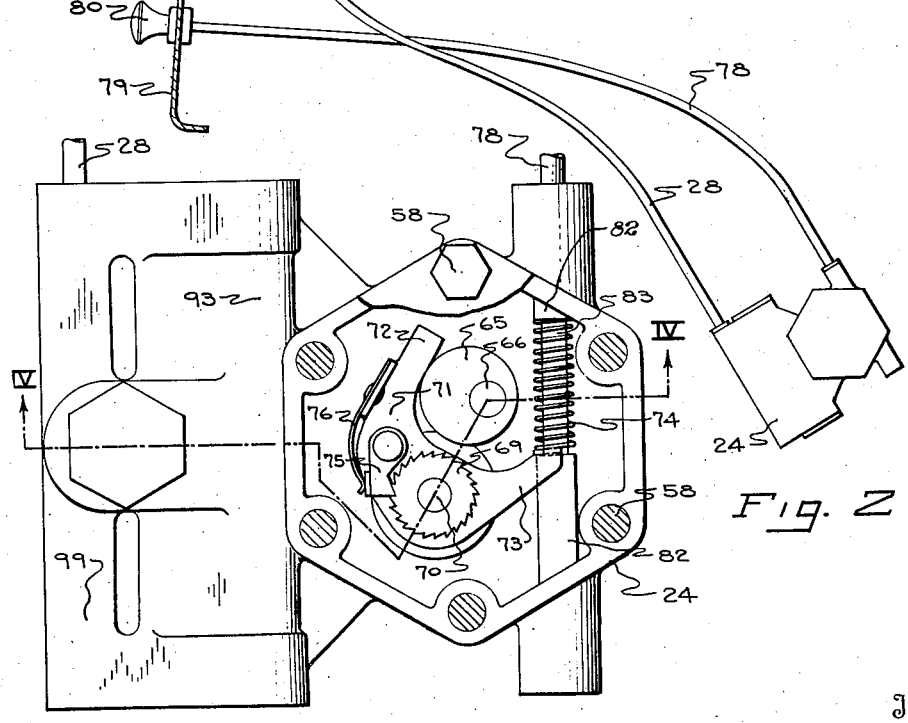
Fig. 2
Fig. 3
Inventor
SAMUEL A. SNELL
By Beaman & Langford
Attorneys

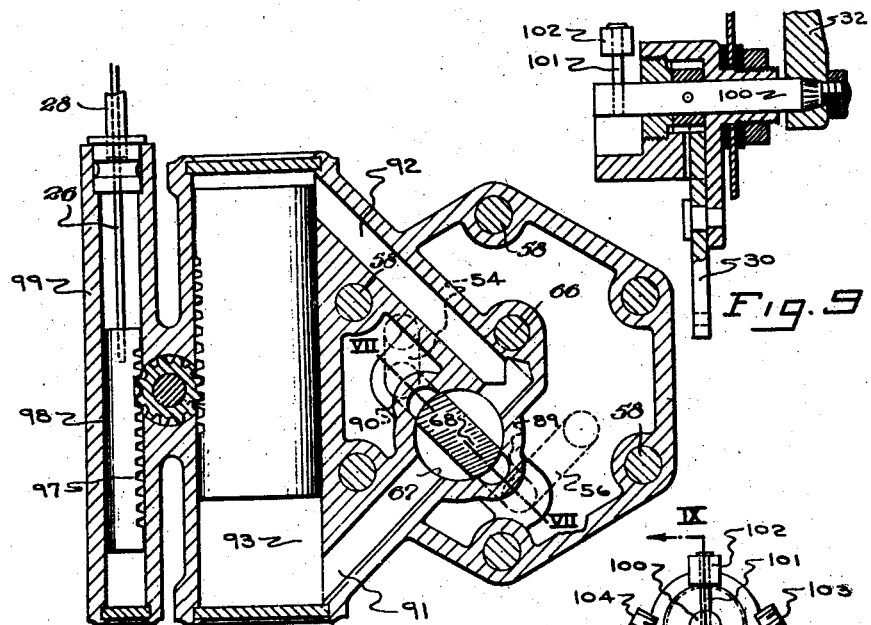

Patented Feb. 20, 1940

2,191,356

UNITED STATES PATENT OFFICE 2,191,356

WINDSHIELD WIPER MECHANISM

Samuel A. Snell, Jackson, Mich., assignor to Townsend F. Beaman, Jackson, Mich., trustee Application June 21, 1939, Serial No. 280,281

7 Claims. (Cl. 15—253)

The present invention relates to improvements in accessory actuating mechanism for vehicles having particular reference to windshield wipers. It is considered that this application is a continuation in part of my co-pending application Serial No. 271,111, filed May 1, 1939.

With the purpose in mind of simplifying the installation and reducing cost, I have adapted the valve mechanism regulating the wiper action disclosed in the aforesaid application for direct association with the oil pump of the vehicle. The arrangement disclosed has the following advantages (1) the unit may be applied as an accessory to vehicles now in use; (2) may be inexpensively applied as standard equipment; (3) wiper strokes per minute will vary proportionately to engine speed; and (4) elimination of conduits and possibility of leakage adjacent interior compartment of vehicle.

In the form of the invention illustrated, the valve mechanism is directly mounted upon the oil pump casing. The gears of the oil pump are driven from the cam shaft in a well known manner and the valve mechanism is connected to one of the driven gears and driven thereby. The valve mechanism and vibrated part for driving the wipers are shown associated in a compact unit with the movement of the vibrated part being transferred to the wiper through housed wires.

Thus, one of the objects of the present invention is to provide accessory actuating mechanism which employs both the movement of and fluid pressure developed by the oil pump for its control and operation.

Another object is to provide novel windshield wiper operating mechanism geared to the oil pump of a vehicle.

Another object is to provide vehicle accessory actuating mechanism which is directly associated with the oil pump to provide compact and convenient installation.

A further object of the present invention resides in the provision of a control and operative unit for accessories having a part vibrated by fluid pressure and a valve mechanism for regulating its vibration combined into a compact unit adaptable to direct, endwise installation upon the oil pump housing.

A still further object resides in providing a novel fluid pressure driving unit for vehicle accessories in which a positively driven valve controls through fluid pressure an adjacent driving part, which in turn remotely actuates an accessory through a positive driving connection.

A still further object resides in providing windshield wiper mechanism in which the rate of travel of the wiper across the windshield is substantially constant while the strokes per minute are directly proportioned to engine speed.

Another object of the invention resides in improvement in windshield wiper mechanism in which the limits of the stroke are adjustable and independent of the mechanism for reversing the direction of wiper movement.

These and other objects and advantages which are considered to reside in the arrangement, construction and combination of parts which go to make the present invention practical in operation and inexpensive in construction will more fully appear from the following description when considered in connection with the annexed claims.

In the drawings,

Fig. 1 is a schematic view of the wipers and actuating mechanism,

Fig. 2 is a schematic elevation showing the relationship of the wiper actuating mechanism and control, Fig. 3 is a plan view partly shown in elevation of the valve and driver unit, Fig. 4 is a vertical cross-sectional view taken on line IV—IV of Fig. 3, Fig. 5 is a horizontal section taken on line V—V of Fig. 4, Fig. 6 is a horizontal sectional view taken on line VI—VI of Fig. 4, Fig. 7 is a cross-sectional view through the valve seat taken on line VII—VII of Fig. 5, Figs. 8 and 9 are enlarged fragmentary views of the limit stops for the wiper arm, and Fig. 10 is a broken cross-sectional view of the control mechanism for the valve.

In Fig. 1 is shown the general arrangement of one manner in which the principles of the present invention may be carried out in practice. An internal combustion engine 10 is illustrated as having a cross shaft 12 driven through a pinion 14 on the cam shaft 16 and a worm gear 18. At one end of the shaft 12 is the distributor 20 while at the opposite end is the oil pump 22. This is all a well known construction.

As an extension of the pump 22, there is provided an actuator unit 24 from which leads a wire 26 located in a conduit 28 and connected to a gear segment 30 for rocking the wiper 32. For dual wipers a similar wire drive 34 can be provided between the segment 30 and the segment 30' for the wiper 32'.

As more clearly shown in Figs. 4 and 6, the oil pump 22 has a gear 44 directly driven by the shaft 12 and a meshing gear 46 indirectly driven thereby. The intake is indicated at 48 with the pressure side of the pump at 50. Disposed upon the housing of the pump 22 is a distributor cap 52 having exhaust and pressure ports 54 and 56, respectively. The unit 24 set upon the cap 52 is held in position by studs 58 anchored in the casting of the pump 22. A shaft 60 with a tongue 61 has driving engagement with the groove 62 in the gear 44. The upper end of the shaft 60 carries a gear 63 which meshes with a gear 64 to drive the eccentric 65 through the shaft 66. Supported for rotation in a tapered seat 67 is a valve 68. A ratchet wheel 69 is fixed to the stem 70 of the valve 68. Freely supported on the stem 70 is an oscillating member 71 having arm portions 72 and 73 of which one is urged into engagement with the eccentric 65 through the action of the spring 74. Located upon the member 71 is a pawl 75 urged by the spring 76 into engagement with the wheel 69. A spring 77 urges the valve 68 to its seat with sufficient force to resist movement of the valve in a direction opposite the step by step movement imparted to the valve 68 upon rotation of the eccentric 65. To stop and start the valve 68, as shown in Figs. 2, 3 and 10, a wire control 78 extending from the instrument panel 79 has an operating knob 80. The end of the wire member 81 is anchored to a slide member 82 reduced at 83 to receive the spring 74 and supported at opposite ends in bores 84 and 85 for lengthwise movement. The reduced portion 83 is cut away at 86 to give clearance to the turned down flange portion 87 of the arm 73 which is acted upon from one side by the spring 74 and is adapted to be engaged from the opposite side by the shoulder 88 when the slide member 82 is moved to the right as viewed in Fig. 10 to swing the arm 72 out of engagement with the eccentric 65 to stop the rotation of the valve 68.

The valve 68 controls the passage of oil under pressure through the port 56 and passage 89 as well as the exhaust of oil through the passage 90 to the exhaust port 54 opening into the intake side of the pump. Upon rotation of the valve 68 the passages 89 and 90 will be alternately connected with the passages 91 and 92 opening into opposite ends of the chamber 93 to reciprocate the piston 94. A rack portion 95 on the piston 94 drives a pinion 96 which in turn engages a rack portion 97 of the rod 98 operating in the chamber 99 to reciprocate the wire drive 28 connected thereto to oscillate the wiper 32.

In Figs. 8 and 9 the oscillated shaft 100 of the wiper 32 is shown equipped with a limit arm 101 having a rubber bumper 102. This bumper is adapted to engage with adjustable stops 103 and 104 which determine the limits of the wiper stroke. This arrangement will enable the wiper blade, for example, to swing into a horizontal position at one end of its stroke and at some angle to the horizontal at the other end of its stroke. Assuming the maximum arc of the wiper to be 180° when the stops 103 and 104 are backed off and the piston 94 permitted to travel to each end of the chamber 93, the adjustment cited would result in a slightly longer dwell at one end of the stroke than at the other and the arresting of the piston 94 short of one end of the chamber 93.

The operation should be clear from the foregoing detailed description: With the engine 10 operating, the pump 22 will develop the oil pressure required for lubrication purposes. The rotation of the gear 44 will impart similar rotation to the gear 63 which will in turn rotate the eccentric 65 through the large gear 64 at a reduction in rate of rotation. A further reduction takes place through the pawl 75 and ratchet wheel 69 with the result that the valve 68 will be rotated at a speed giving the wiper 32 in the order of 20 to 80 strokes per minute over the normal range of engine operation. Experiments appear to establish the fact that effective wiper action during a rainstorm requires an increase in rate of wiper operation proportional to ground speed of the vehicle. For each rotation of the valve 68 the piston 94 will move back and forth in the chamber 93 to impart two complete strokes across the windshield to the wiper 32. By building the control valve 68 and driving piston 94 into a compact unit it should be appreciated that there will be less pipe friction and viscosity of the oil will be of less importance. Moreover, by confining all of the oil conduits and joints to the neighborhood of the oil pump leakage is of less a problem.

Having described my invention, what I desire to protect by Letters Patent and claim is:

1. In combination with the oil pump of the lubricating system of a motor vehicle, an oil pressure operated driver for actuating an accessory, conduit means including a valve for directing oil under pressure against said driver extending between said oil pump and said driver, and a driving connection between said valve and said oil pump.

2. In combination with the oil pump connected to a source of oil and located in the lubricating system of a motor vehicle and having a rotated part, an oil pressure reciprocated piston for actuating an accessory, conduit means including a valve for alternately directing oil under pressure against opposite ends of the piston for reciprocating the same, and a driving connection between said valve and said rotated part whereby the frequency of reciprocation of said driver is proportional to the rotation of said part.

3. In combination with a driven pump for creating fluid pressure, a part reciprocated by fluid pressure for driving an accessory, conduit means connecting said pump and part for reciprocating the latter by fluid pressure, a valve located in said means for controlling the frequency of reciprocation of said part, and a driving connection between said pump and valve whereby the frequency of reciprocation of said part is proportional to the rate of operation of said pump and the rate of movement of said part is dependent on the displacement of fluid through said conduit means by said pump.

4. A windshield wiper actuating mechanism having in combination an oil pump having a rotated part, a part reciprocated by oil pressure, a positive drive connection for attachment to a wiper operatively connected to said reciprocated part, conduit means between said oil pump and said reciprocated part for directing intermittent charges of oil pressure against said part to move the same back and forth, and a valve located in said conduit means and having a mechanical driving connection with said rotated part whereby said valve is positively driven for controlling the charges of oil pressure against said reciprocated part.

5. An accessory driver unit for windshield wipers and the like adapted for direct installation upon the housing of an oil pump connected to a source of oil and located in the lubricating system of an internal combustion engine comprising an oil pressure reciprocated driver part, conduit means for connection to the high and low pressure sides of the oil pump for conducting oil pressure to said part to opposite sides thereof, a valve located in said means for controlling the flow of oil pressure against said driver part, and a connector portion for gearing said valve to a moving part of the pump.

6. In combination with a vehicle having a substantially positively driven part and a source of fluid pressure, of a windshield wiper and an actuating mechanism connected to and deriving its actuating power from said source of fluid pressure, a valve for controlling the flow of fluid pressure to said actuating mechanism and the frequency of operation of the wiper upon the windshield, said valve being driven independently of said actuating mechanism and independent of the operating stroke of said wiper, and speed reducing means interposed between said valve and said driven part for imparting to said valve a cycle of operation producing effective wiping action upon the windshield.

7. In combination with a vehicle including a source of fluid pressure and a non-fluid source of operating power, of a windshield wiper having actuating mechanism connected to and deriving its actuating power from said source of fluid pressure, a valve for controlling the flow of fluid pressure to said actuating mechanism as well as controlling the frequency of operation of the wiper upon the windshield, said valve being driven independently of said actuating mechanism and being independent of the operating stroke of said wiper, and means connecting said valve to said non-fluid source of operating power for driving said valve therefrom with a cycle of operation producing effective wiping action upon the windshield.

SAMUEL A. SNELL.